UNITED STATES PATENT OFFICE.

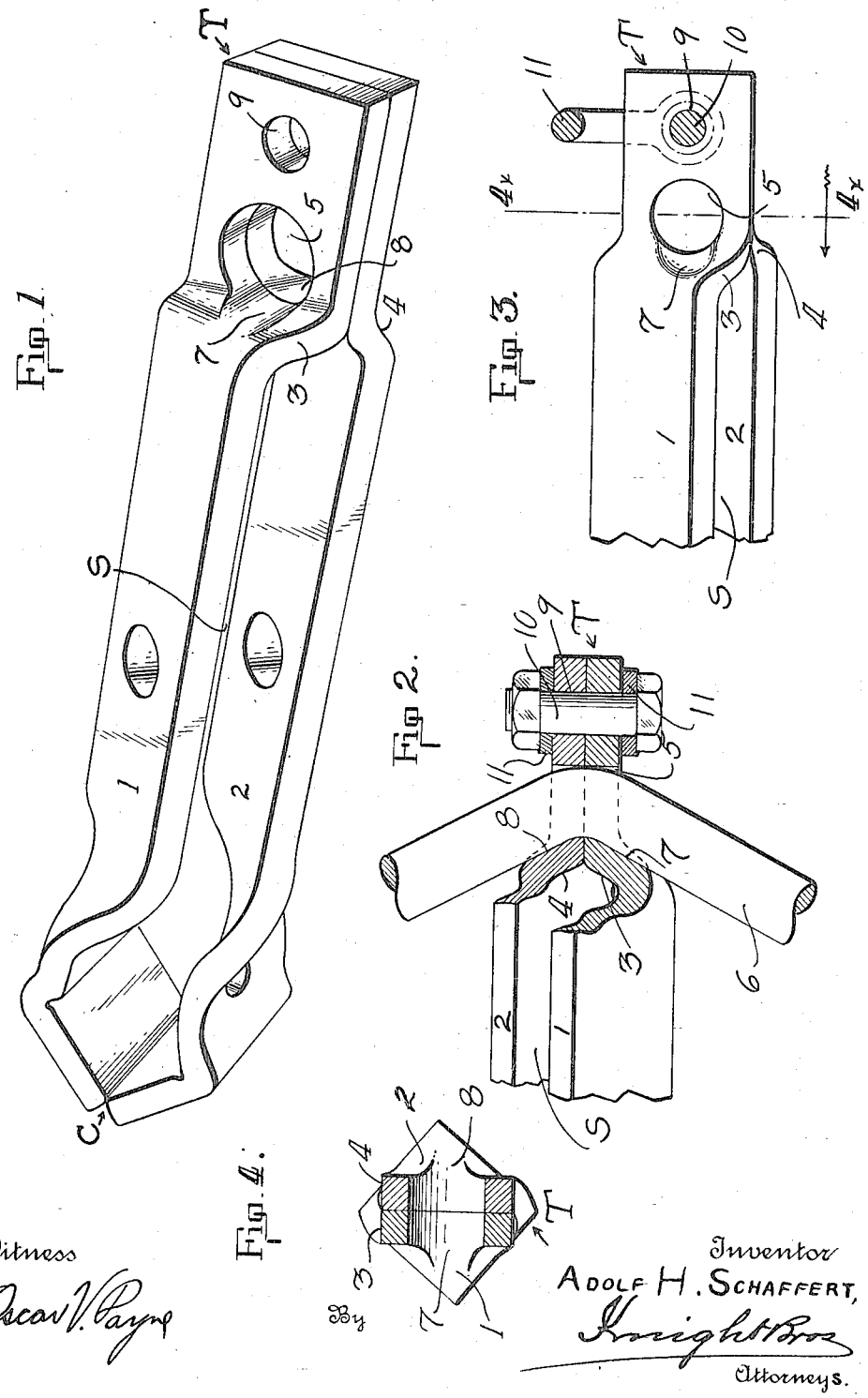

ADOLF H. SCHAFFERT, OF CLEVELAND, OHIO, ASSIGNOR TO THE DAMASCUS BRAKE BEAM CO., OF CLEVELAND, OHIO, A CORPORATION OF OHIO.

BRAKE-BEAM FULCRUM.

1,220,690.  Specification of Letters Patent.  Patented Mar. 27, 1917.

Application filed August 22, 1916. Serial No. 116,368.

*To all whom it may concern:*

Be it known that I, ADOLF H. SCHAFFERT, a citizen of the United States, residing at Cleveland, in the county of Cuyahoga and State of Ohio, have invented certain new and useful Improvements in Brake-Beam Fulcrums, of which the following is a specification.

This invention relates to fulcrums or struts for trussed brake beams and particularly to that class of such members constructed from two metal bars formed either from originally separate pieces, or from a single piece bent upon itself at its middle point and having the bars spaced apart intermediately of the ends of the member to provide a slot for the brake lever, and having the ends of the member fashioned to enter into bearing with the compression and tension members of the trussed beam.

It has heretofore been proposed to provide the tension member bearing on such a brake beam fulcrum, by perforating the outer end of the fulcrum and passing the tension member through the perforation; but in such fulcrums, it has been found necessary to use a filling piece or other accessory in obtaining the necessary bearing for the tension member, which adds expense in production and assembling; moreover, such constructions as heretofore designed have prevented location of the tension member bearing in close proximity to the end of the lever slot and, consequently, with a given length of slot, the length of the fulcrum member has been undesirably long.

The present invention overcomes these objections, and secures certain advantages not heretofore obtained in a fulcrum of this type, by providing shoulders between the spaced walls of the lever slot and the portion of the fulcrum extending beyond the slot, and so relating the perforation to these shoulders, that the shoulders will form continuations of the tension member bearing and so afford a sufficient length of seat or saddle to render unnecessary the use of a separate filler or other piece; and if these shoulders also form the end of the lever slot, an exceptionally long slot relatively to the whole length of the fulcrum, will be obtained. If the shoulders be given the proper angle and the bearing portion of the tension member be correspondingly bent, the additional advantage is secured, of having the walls of the slot pressed together at the front end by the stress developed between the fulcrum and the tension member, thus affording an additional safeguard against buckling of the fulcrum; and if the forward ends of the bars beyond the slot, are brought into abutment, as is preferred, and extended beyond the tension member seat, they afford the still further advantages of resisting inward rolling of the end walls of the slot and affording a projection for attachment of a third point support.

The invention is not limited to the use of all of the structural characteristics above suggested in combination, but is believed to consist broadly in the employment of these features separately, as well as collectively.

In the accompanying drawings, in which one embodiment of the invention is shown by way of illustration—

Figure 1 is a perspective view of the complete fulcrum;

Fig. 2 is a detail view of the forward end of the fulcrum, with the tension member seat in horizontal section;

Fig. 3 is a side elevation of the forward end of the fulcrum;

Fig. 4 is a section on the line $4^x$—$4^x$, Fig. 3.

Referring to the drawings in detail, 1 and 2 represent flat metal bars, preferably of rolled steel stock, which may be in separate pieces or a single piece folded intermediately at a point that is to constitute one end of the fulcrum, according to the particular one of the methods heretofore suggested for making fulcrums of this type, that may be preferred. The fulcrum has its inner end C fashioned in any suitable manner to enter into bearing with the compression member and its outer end T fashioned, as hereinafter described, in accordance with the present invention; the intermediate portions of the bars being spaced apart to form the lever slot S, and being torsionally displaced relatively to the end C, to give the lever slot an angular position as is well understood in the construction of fulcrums of this type.

In shaping the outer end T of the fulcrum, the bars are bent inwardly, as shown at 3 and 4, to provide shoulders 7 and 8 which are preferably of such dimension as to bring the ends of the bars into facial abutment beyond said shoulders, and a bore or opening 5 is formed in the ends of the bars in such close proximity to the shoulders 7 and 8, that the shoulders and the wall of the bore collectively form an elongated seat or saddle for the tension member; the shoulders being preferably concave or otherwise finished to conform to the bearing face of the tension member. The elongated seat thus formed has its medial plane coincident with the axial plane of the tension member and, consequently, intersects the dividing plane of the bars. In order that the abutting ends of the bars may lie perpendicularly to the axial plane of the tension member, bends 3 and 4 are preferably made to involve a twisting as well as an inward deflection, relatively to the lever slot, but this is a matter of election, since it is obvious that alinement of the elongated saddle with the tension member, coupled with perforation of the fulcrum and intersection of the plane of abutment between the ends of the fulcrum bars, are conditions that could be realized without having the plane of abutment between the bars and the axial plane of the tension member perpendicular to each other.

Preferably the bends 3 and 4 which form the shoulder 7 are also those which define the forward end of the lever slot, and as such, bring the tension member bearing and the end of the slot in such close proximity as to afford the extra length of slot, for a given length of fulcrum, hereinbefore referred to.

As will readily be seen from the relation of the tension member 6 to its seat or saddle 7, 5, 8, as illustrated in Fig. 2, the structural characteristics already described, lend themselves with peculiar advantage, to a method of assembly that not only insures intersection of the plane of abutment between the bars, but distributes the stresses developed in service, in directions that hold the bars together at their outer ends, and resists spreading or buckling of the walls of the slot. That is to say, shoulders 7 and 8 may be inclined and the tension member 6 bent to conform to such inclination, as shown in Fig. 2, so that when braking force is applied longitudinally of the fulcrum, and outwardly at the crest of the tension member, the latter will tend to bind the bars together and thus further safeguard the structure with a minimum expenditure for structural and assembly expense.

By having the ends of the bars extended beyond the bore 5, and held firmly in abutment, the shoulders are greatly strengthened against rolling inward toward the lever slot under the stresses incident to service; besides, ample extension is afforded for a third point hanger which may be of any suitable form and combined with the end securing means in any suitable manner, as for instance by having a rivet hole 9 to receive the rivet 10 and using this rivet to simultaneously hold the clevis or shackle 11.

I claim:—

1. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat.

2. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the portions of said seat formed by said shoulders being shaped to conform to the bearing portion of the tension member to be received in said seat.

3. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the perforated ends of the bars having their opposed faces in abutment.

4. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the perforated ends of the bars being torsionally deflected relatively to the spaced portions thereof.

5. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; said ends being also torsionally deflected at said shoulders, and the portions of said seat formed by said shoulders being shaped to conform to the bearing portion of the tension member to be received in said seat.

6. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the portions of the shoulders forming parts of the seat being inclined rearwardly with relation to the axis of the bore so that a tension member bent to conform to the inclination of the shoulders will press the shoulders toward each other under the stress developed in service.

7. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the spaced portions of the bars forming a brake-lever slot, and said shoulders forming the end walls of said slot.

8. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the perforated ends of the bars having their opposed faces in abutment and being extended forward from their perforation.

9. A brake beam fulcrum comprising a pair of spaced metal bars having their tension member ends deflected toward each other to provide shoulders, and having a perforation adjacent to said shoulders, with the wall of the perforation forming with said shoulders, an elongated tension member seat; the perforated ends of the bars having their opposed faces in abutment and being extended forward from their perforation, and provided with means for attaching a third point support beyond the same.

The foregoing specification signed at Rochester, New York, this 11th day of August, 1916.

ADOLF H. SCHAFFERT.

Copies of this patent may be obtained for five cents each, by addressing the "Commissioner of Patents, Washington, D. C."